United States Patent [19]

Tamura

[11] 4,335,397
[45] Jun. 15, 1982

[54] METHOD AND APPARATUS FOR DIGITALLY ADJUSTING WHITE BALANCE

[75] Inventor: Eiji Tamura, Tokyo, Japan

[73] Assignee: Sony Corporation, Tokyo, Japan

[21] Appl. No.: 162,640

[22] Filed: Jun. 24, 1980

[51] Int. Cl.³ .............................................. H04N 9/535
[52] U.S. Cl. .................................................... 358/29
[58] Field of Search ..................................... 358/27, 29

[56] References Cited

U.S. PATENT DOCUMENTS 4,219,841  8/1980  Nishimura et al. .................... 358/29
4,274,107  6/1981  Tamura et al. ......................... 358/29

*Primary Examiner*—John C. Martin
*Attorney, Agent, or Firm*—Lewis H. Eslinger; Alvin Sinderbrand

[57] ABSTRACT

A white balance circuit for adjusting white balance in a composite color signal, having a luminance component and color difference signals, produced from a color television camera utilizes a microcomputer having a random-access-memory (RAM) to control the white balance digitally. A reference video signal is sampled during a blanking interval, then is stored as a digital quantity in a first location in the RAM. Then one color difference signal (R-Y) is sampled during a scanning interval, and is stored as a digital quantity in a second location in the RAM. Then the quantity stored in the second location is modified so that its value is substantially the same as that of the quantity stored in the first location. A correction signal varies with the luminance component and is proportional to the value of the quantity stored in the second location, and this correction signal is combined with the color difference signal to effect coarse adjustment of white balance. Fine adjustment is achieved by performing a predetermined number N of iterations of converting the quantity stored in the second location to an analog level, comparing such level with the level of the color difference signal, changing the quantity in the second location by one bit in the sense to minimize the difference between the two levels, and adjusting the correction signal in accordance with the changed quantity in the second location of the RAM.

10 Claims, 6 Drawing Figures

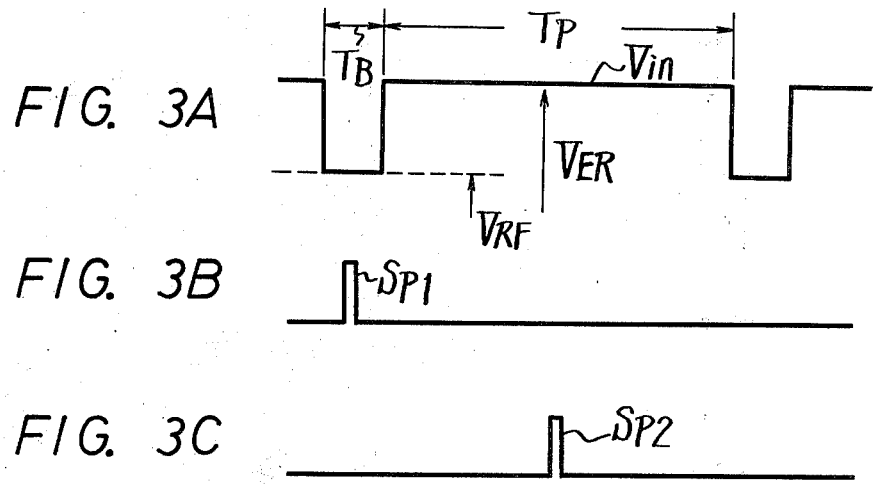
FIG. 3A
FIG. 3B
FIG. 3C
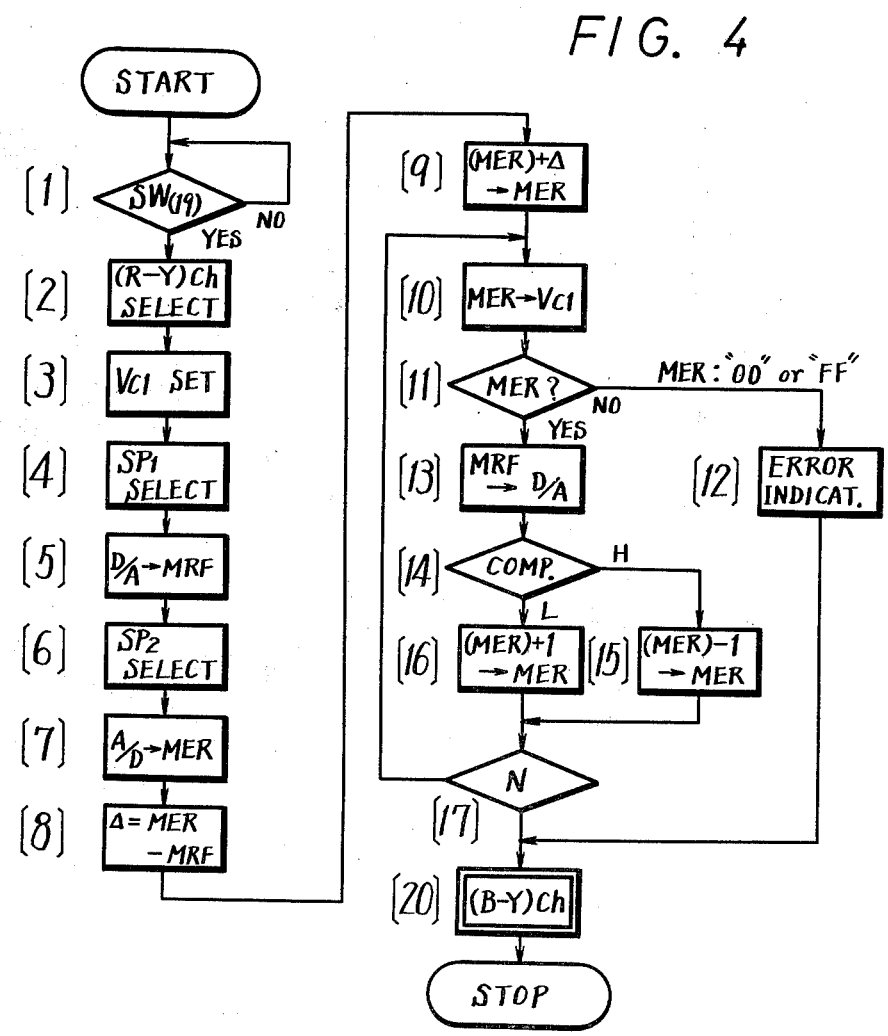
FIG. 4

METHOD AND APPARATUS FOR DIGITALLY ADJUSTING WHITE BALANCE

BACKGROUND OF THE INVENTION

1. Field of the Invention

The present invention relates generally to a system for processing a video signal provided from a television camera, and is more particularly directed to method and aparatus for adjusting the white balance of a video signal by use of a simple arrangement including a so-called microcomputer or microprocessor.

2. Description of the Prior Art

In conventional white-balance adjustment systems, such as that described below with reference to FIG. 1, the levels of the red (R-Y) and blue (B-Y) color difference signals provided from a television camera are compared, for instance, in a window comparator, with an upper threshold voltage and with a lower threshold voltage, and an up/down counter is caused to count up and to count down whenever the color difference signal is below the lower threshold voltage and above the upper threshold voltage, respectively. Then, the count on the up/down counter is converted to an analog control voltage and is applied to a gain-controlled amplifier to control its gain. The gain-controlled amplifier, which processes a signal taken from the luminance component provided from the television camera, provides a correction signal which varies with the luminance component and which is proportional to the count on the up/down counter. The correction signal is then combined with the associated color difference signal to provide a white-balance-adjusted color difference signal.

In such a prior art arrangement, if the color difference signal is outside the range defined by the upper and lower threshold voltages, the gain of the gain-controlled amplifier is adjusted so that the level of the associated color difference signal is returned within the range between the threshold voltages.

However, in such a conventional arrangement, the upper and lower threshold values are established by a circuit system apart from the channels which process the color difference signals. As a result, drift error often occurs in the threshold voltages so that, after a lapse of time, it is possible that the conventional white balance adjustment system will be unable to effect accurate correction of white balance.

In addition, because the up/down counters associated with the conventional system count one bit at a time, a significant amount of time is used in making large adjustments in white balance, for instance, in order to accommodate large changes in color temperature of an illuminating light source.

OBJECTS AND SUMMARY OF THE INVENTION

Accordingly, it is an object of the present invention to provide a method and apparatus for adjusting white balance which avoids the problems encountered in the prior art.

It is another object of the present invention to provide a method and apparatus for adjusting white balance by means of a simple arrangement including a microcomputer or microprocessor.

It is a further object of this invention to provide a method and apparatus for achieving white balance adjustment in a television camera, so that if a white object is observed by the television camera, the color difference signals are adjusted in their respective levels by combining therewith a signal which varies with the luminance signal and which is proportional to a digital quantity that is calculated to correspond to the value of the color difference signal during a blanking interval.

It is yet another object of this invention to provide a method and apparatus for adjusting white balance, in which a reference level used for achieving white balance adjustment and the levels of the correction signals used to achieve white balance adjustment are all computed by utilizing the same signal processing system, so that a television camera utilizing the present invention will be free of white balance adjustment error due to drift error.

It is still another object of the present invention to provide a method and apparatus which can very quickly achieve white balance adjustment.

It is a further object of this invention to provide a method and apparatus for adjusting white balance in which, first, a coarse adjustment in white balance is achieved, and then, thereafter, a more precise fine adjustment is performed, thereby minimizing the amount of time required to achieve white balance adjustment.

It is a still further object of this invention to provide a method and apparatus for adjusting white balance, in which a correct adjustment of white balance is achieved despite any vibration or other motion of the camera while it is observing a white reference object.

According to one aspect of this invention, there is provided a method of adjusting the white balance of a video signal formed of a luminance component and at least a first color difference signal, and having video scanning intervals and blanking intervals; and which uses a microcomputer including a random-access-memory (RAM) having at least first and second adjustable storage locations. Such method comprises the steps of sampling a reference video signal during one of the blanking intervals; converting the sampled reference video signal from analog form to digital form so as to form a digital reference signal; storing the digital reference signal in the first storage location of the RAM; sampling the first color difference signal during one of the video scanning intervals; converting the sampled first color difference signal from analog form to digital form to so form a first digital color difference signal; storing the first digital color difference signal in the second storage location of the RAM; modifying the stored first digital color difference signal stored in the second storage location so that the modified stored first digital color difference signal is substantially the same digital value as the digital reference signal stored in the first storage location of the RAM; forming a first color difference correction signal that varies with the luminance component and is proportional to the value of the modified stored first digital color difference signal; and combining the first color difference signal with the first color difference correction signal. The above method achieves good coarse adjustment of white balance; however, in order to achieve fine adjustment thereof, the method according to this invention can further include the steps of digital-to-analog converting the modified stored first color difference signal stored in the second storage location of the RAM to an analog reference level, level-comparing the analog reference signal with the level of the first color difference signal; changing the modified stored first color difference signal by a predetermined increment in the sense to minimize the difference in level between the analog reference level and the first color difference signal; and adjusting the first color difference correction signal in accordance with the value of the changed stored first color difference signal stored in the second storage location. The foregoing steps for achieving fine adjustment of white balance are preferably repeated for a predetermined number of iterations. In order to adjust the white balance in respect to a second color difference signal as well as the first color difference signal, the method of adjusting white balance according to this invention further includes steps similar to the foregoing for providing a second color difference correction signal, which corresponds to a modified stored second digital color difference signal stored in a third storage location in the RAM, to be combined with the second color difference signal to achieve complete white balance adjustment.

In accordance with another aspect of this invention, a color television camera of the type which provides a composite color television signal formed of a luminance component and at least one color difference signal and having scanning intervals separated by blanking intervals, includes a white balance control circuit comprising a mixer to combine, with the color difference signal, a color difference correction signal; and adjustable gain control circuit providing, as the color difference correction signal, a signal that varies with the luminance component and is proportional to a gain control signal applied thereto; a circuit for sampling the color difference signal during one of the blanking intervals to provide a reference signal and during one of the scanning intervals to provide a sampled color difference signal; a circuit for convering the reference signal and the sampled color difference signal to digital form; a storage memory having a plurality of storage locations for storing the converted reference signal and the converted sampled color difference signal in respective storage locations therein; circuitry for modifying the stored converted sampled color difference signal so that the latter has substantially the same digital value as the converted reference signal; and circuitry for providing, as the gain control signal, a level proportional to the stored value of the converted sampled color difference signal. Preferably, the white balance control circuit also includes a manually-actuated switch for selectively initiating a white balance adjustment operation, and an indicator circuit for detecting whether the stored converted sampled color difference signal is outside a predetermined range and providing an indication when the stored converted sampled color difference signal is outside that range.

BRIEF DESCRIPTION OF THE DRAWINGS

FIGS. 3A–3C are waveform diagrams used for explaining the present invention; and FIG. 4 is a flow chart for explaining the steps of one embodiment of the method of this invention.

DESCRIPTION OF THE PREFERRED EMBODIMENT

Figure 1:
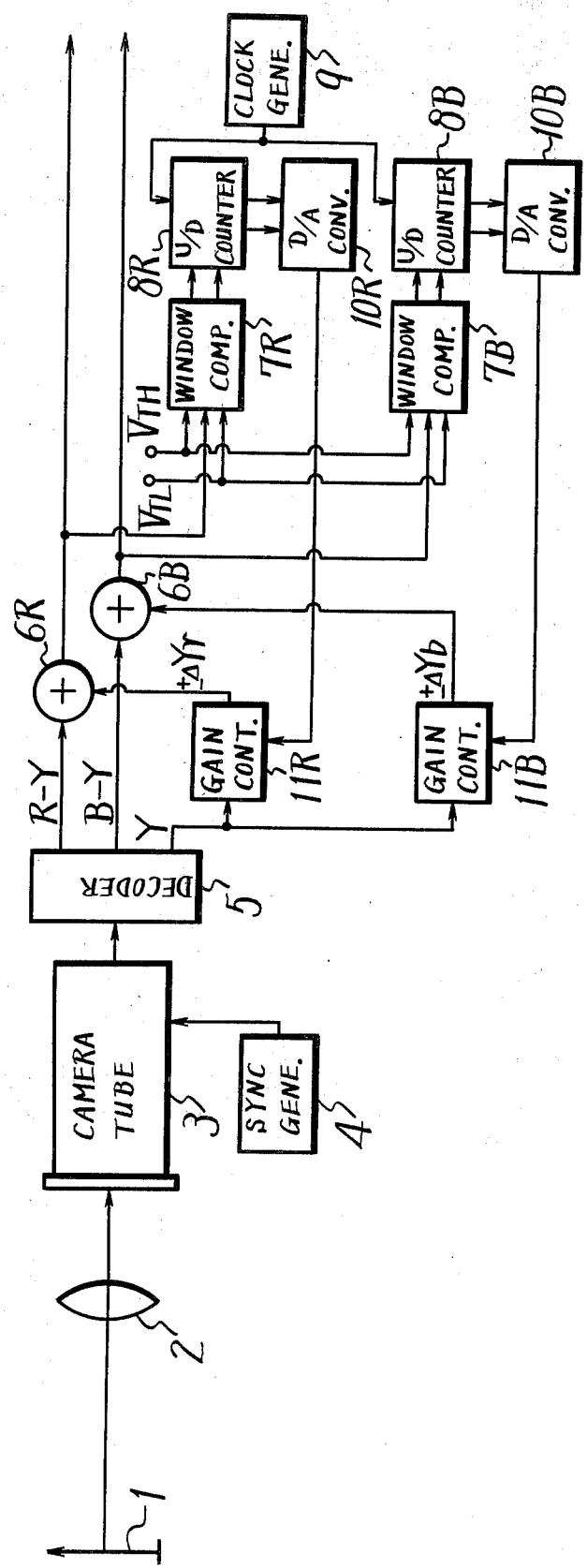
FIG. 1 is a diagram of a conventional white balance adjusting system.

For purposes of background, a conventional white balance adjusting system will be decribed with reference to FIG. 1. In the conventional system, a white reference object 1 is observed through an objective lens 2 by a color camera tube 3, such as a vidicon. A synchronizing signal generator 4 provides horizontal and vertical synchronizing signals to the camera tube 3. A decoder 5 changes the camera output signal to a composite color video signal formed of a luminance component Y and red and blue color difference signals R-Y and B-Y. White-balance-adjusting mixers 6R and 6B are provided to add respective color difference correcting signals $\Delta Y_r$ and $\Delta Y_b$ to the red color difference signal R-Y and to the blue difference signal B-Y, respectively, thereby to adjust the level of the color difference signal R-Y and B-Y to account for changes in the color temperature of light illuminating the object 1.

Window comparators 7R and 7B are associated with each of the mixers 6R and 6B to compare the level of the adjusted color difference signal R-Y$\pm\Delta Y_r$ and B-Y$\pm\Delta Y_b$ with low and high threshold voltages $V_{TL}$ and $V_{TH}$, respectively. Up/down counters 8A and 8B associated with window comparators 7R and 7B, respectively, are each arranged to count up and to count down when the value of the associated adjusted color difference signal R-Y$\pm\Delta Y_r$ and B-Y$\pm\Delta Y_b$ is below the low threshold voltage $V_{TL}$ and above the high threshold voltage $V_{TH}$, respectively. These counters 8R and 8B cease counting as soon as the associated adjusted color difference signal R-Y$\pm\Delta Y_r$ and B-Y$\pm\Delta Y_b$ is within the window defined by the threshold voltages $V_{TL}$ and $V_{TH}$. A clock generator 9 provides counting signals to a clock input on each of the counters 8R and 8B. Digital-to-analog converters 10R and 10B, associated with the counters 8R and 8B, respectively, provide analog gain control signals corresponding to the count on counters 8R and 8B to respective gain-control circuits 11R and 11B. Each of the latter provide, as the respective color difference correcting signal $\Delta Y_r$ and $\Delta Y_b$, a signal that varies with the luminance component Y and which is proportional to the gain control signal provided from the associated converters 10R and 10B.

In such a conventional arrangement, if the color difference signals R-Y and B-Y are outside the range, or window defined by the threshold voltages $V_{TH}$ and $V_{TL}$, gain control circuits 11R and 11B are controlled so as to adjust the levels of color difference correction signals $\Delta Y_r$ and $\Delta Y_b$, which are supplied to mixers 6R and 6B. As a result, adjusted color difference signals R-Y$\pm\Delta Y_r$ and B-Y$\pm\Delta Y_b$ are returned within the range defined by threshold voltages $V_{TH}$ and $V_{TL}$.

However, in such a conventional arrangement, because the threshold voltages $V_{TH}$ and $V_{TL}$ are established by circuitry other than the circuitry defining channels for passing color difference signals R-Y and B-Y, drift error can occur in the threshold voltages $V_{TH}$ and $V_{TL}$ owing to, for example, changes in circuit constants (i.e. resistance values and capacitance values) because of changes in temperature, or merely because of aging of the equipment.

Moreover, because up/down counters 8R and 8B can count only one bit at a time, the color difference correction signals $\Delta Y_r$ and $\Delta Y_b$ can be adjusted only in increments corresponding to such one-bit changes in the counts of counters 8R and 8B. As a result, a considerable amount of time is required to effect large changes in white balance, that is, to compensate for large changes in the color temperature of light illuminating object 1.

Figure 2:
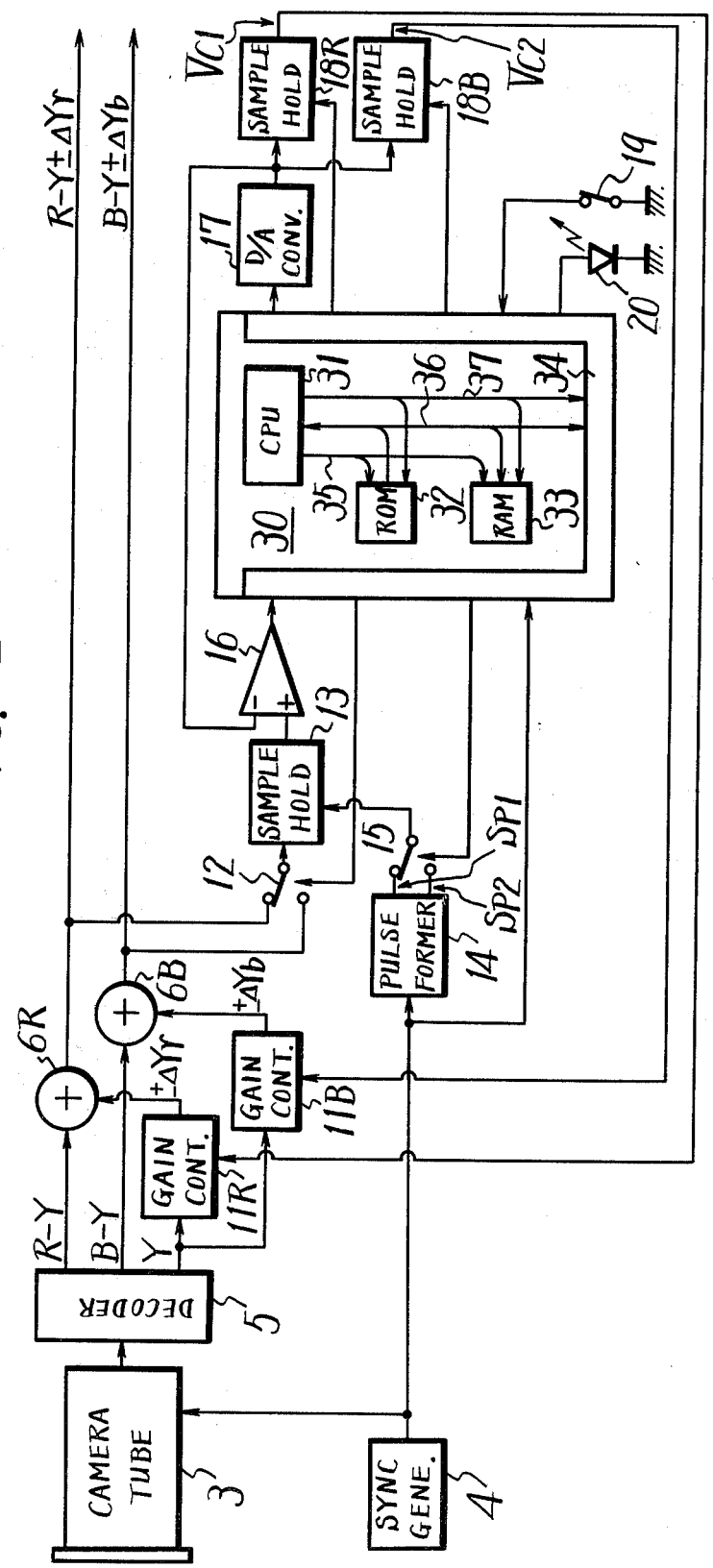
FIG. 2 is a diagram showing a preferred embodiment of a white balance control circuit according to this invention, and by which the method of this invention is explained.

FIG. 2 illustrates an embodiment of a color television camera including a white balance control circuit according to this invention. In FIG. 2, elements in common with those in the arrangement of FIG. 1 are identified by like reference characters, and a detailed description thereof is omitted.

In the embodiment shown in FIG. 2, a change-over switch 12 is provided to selectively couple the adjusted color difference signals R-Y±ΔY$_r$ and B-Y±ΔY$_b$ from mixers 6R and 6B to a sample-and-hold circuit 13. A pulse former 14 is coupled to receive synchronizing signals from synchronizing signal generator 4, and, at outputs thereof, to provide sampling signals S$_{P1}$ and S$_{P2}$, as shown in FIGS. 3B and 3C, respectively, and as described below. A change-over switch 15 selectively couples the outputs of pulse former 14 to sample-and-hold circuit 13. A comparator 16 has (+) and (−) input terminals coupled to receive outputs from the sample-and-hold circuit 13 and from a digital-to-analog converter 17, respectively. A microcomputer 30, to be described in detail below, is coupled to the output of comparator 16, and provides a digital signal to converter 17. Sample-and-hold circuits 18R and 18B, which are coupled to the output of converter 17, provide at outputs thereof, control voltages V$_{C1}$ and V$_{C2}$ to control the gains of gain-controlled amplifiers 11R and 11B, respectively. A manual switch 19 which is actuated to initiate a white balance operation, and an error indicator, here an LED 20, are also coupled to the microcomputer 30.

Microcomputer 30, here illustrated in a simplified block-diagram form, includes a central processing unit (CPU) 31 to perform arithmetic and control functions, a read-only-memory (ROM) 32 to store program information for performing the sequence of steps described below, a random-access-memory (RAM) having at least three storage locations therein, to store digitized quantities corresponding to levels sampled by sample-and-hold circuit 13, and an input-output control circuit 34 arranged to couple the microcomputer 30 to external elements such as comparator 16, synchronizing signal generator 4, switches 12,15,19, digital-to-analog converter 17, sample-and-hold circuits 18R and 18B, and error indicator 20. Also included in microcomputer 30 are an address bus line 35, a data bus 36, and a control bus 37. The general construction of such a microcomputer 30 is conventional. Preferably, the entire microcomputer 30 is formed as a single-chip large-scale integrated circuit (LSI). As the terms "microcomputer" and "microprocessor" are variously used in the art to describe devices such as microcomputer 30, the term microcomputer used in this description is intended to encompass both microcomputers and microprocessors, as well as other equivalent devices.

As mentioned above, ROM 32 has stored therein a program to carry out the steps required by the present invention as illustrated in the flow chart shown in FIG. 4. In the program in ROM 32 in this embodiment, the color difference signal R-Y is first adjusted for white balance, and then, subsequently, the blue color difference signal B-Y is adjusted for white balance. However, it should be noted that it would be equivalent to first adjust the blue color difference signal B-Y, and then thereafter to adjust the red color difference signal R-Y.

Also, it is possible to interleave the steps in the program stored in ROM 32 such that the adjustment of the red color difference signal R-Y and the adjustment of the blue color difference signal B-Y are performed substantially at the same time.

As shown in FIG. 3A, a video input signal V$_{in}$, here corresponding to the red color difference signal R-Y, has a reference-value level V$_{RF}$ during the blanking interval T$_B$, and has a level V$_{ER}$ during the scanning interval T$_P$. As shown in FIGS. 3B and 3C, sampling pulses S$_{P1}$ and S$_{P2}$ are respectively provided, by pulse former 14, during the blanking interval T$_B$ and during the scanning interval T$_P$.

The operation of the arrangement shown in FIG. 2 is explained with respect to the flow chart of FIG. 4.

Initially, execution of the program stored in ROM 32 is initiated, for example, by receipt of a synchronizing pulse from synchronizing signal generator 4.

In step 1, switch 19 is scanned to determine whether it is open or closed: If switch 19 is open, step 1 is repeated ("NO" in the flow chart); if it is closed, then the program proceeds to step 2 ("YES" in the flow chart).

In step 2, switch 12 is actuated to select the red color difference signal R-Y at the output of mixer 6R.

In step 3, microcomputer 30 provides a digital value, such as the hexadecimal number "80" (corresponding to decimal 128) to digital-to-analog converter 17 so that the gain control circuit 11R is set to a reference gain corresponding to the value "80". It is noted that throughout this description, the numbers enclosed in quotation marks represent hexadecimal values. Thus, coverter 17 provides a corresponding analog voltage through sample-and-hold circuit 18R as a gain control signal to gain control circuit 11R.

In step 4, switch 15 is actuated to supply sampling pulse S$_{P1}$ (FIG. 3B) to sample-and-hold circuit 13.

In step 5, the reference level V$_{RF}$ is sampled in the sample-and-hold circuit 13 and then applied to the (+) input terminal of comparator 16. Then, the sampled value of reference level V$_{RF}$ is stored in digital form as a quantity MRF at a first storage location in RAM 33. Subsequently, the quantity MRF is read out from the first storage location and is converted in converter 17 to analog form and is applied to the (−) input terminal of comparator 16, and such analog level is sequentially compared with the signal level applied to the (+) input terminal of comparator 16. The quantity MRF stored at the first storage location of RAM 33 is sequentially modified, thereby changing the output level of the D/A converter 17 until the levels at the (+) and (−) input terminals of comparator 16 are substantially equal to one another. Then, the quantity MRF stored in the first storage location corresponds in value substantially to the level V$_{RF}$ stored in sample-and-hold circuit 13.

In step 6, switch 15 is actuated to supply sampling pulse S$_{P2}$ (FIG. 3C) to sample-and-hold circuit 13.

In step 7, signal level V$_{ER}$ (FIG. 3A) is sampled and held in sample-and-hold circuit 13, and thereafter, is converted to digital form and is stored as a digital quantity MER in a second storage location in RAM 33. Thus, at the end of step 7, the quantity MRF corresponding to the reference (blanking) level of the video signal during a blanking interval T$_B$ is stored at a first location in RAM 33 while the quantity MER, corresponding to the level V$_{ER}$ of the red color difference signal R-Y during a scanning interval T$_P$ is stored in a second storage location in RAM 33.

In step 8, a computational step, CPU 31 calculates the difference between quantity MER in the second storage location and quantity MRF in the first storage location.

In step 9, a quantity (MER) equal to "80" minus the difference quantity calculated in step 8 (i.e., "80"−[MER−MRF]) replaces the quantity stored in the second storage location in RAM 33. In other words, the quantity MER is decreased if the difference calculated in step 8 is negative, but is increased if the difference calculated in step 8 is positive. At the end of step 9, the new quantity (MER) is stored in the second storage location of the RAM 33, and that quantity (MER) represents a correction from the mid-range value (i.e., "80") of the gain of the gain-control circuit 11R.

In step 10, CPU 31 addresses the second storage location in RAM 33 so that the quantity MER stored therein is applied to digital-to-analog converter 17. Thus, an analog level corresponding to the quantity MER is provided from converter 17 to sample-and-hold circuit 18R. Sample-and-hold circuit 18R then provides at its output the gain control signal $V_{Cl}$, corrected according to the calculations described above, to gain control circuit 11R. Therefore, the level of the red color difference signal R-Y is adjusted by changing the value of correction signal $\Delta Y_r$, so that the level $V_{ER}$ of the adjusted red color difference signal R-Y$\pm\Delta Y_r$ corresponds to the level $V_{RF}$. The color difference correction signal $\Delta Y_r$ provided at the end of step 10 provides a good coarse adjustment of the white balance, and the white balance adjustment operation can end here, if desired.

However, because a residual error is introduced by gain control circuit 11R and because of irregularities in the level of the luminance signal Y, the method according to the present invention provides the following steps 11–17 to effect fine adjustment in the white balance of the red color difference signal R-Y. Furthermore, rocking and/or vibration of the camera will cause slight variations in the luminance level if a portable camera is used, and the above steps 1–10 might not provide sufficiently exact adjustment of white balance.

In step 11, which is a decisional step, the microcomputer 30 decides whether to proceed with the fine adjustment by determining whether the quantity MER is outside a predetermined range, thereby indicating that the white balance adjustment to be made is outside the correction range of the white balance adjusting system. More particularly, if the quantity MER is equal to "00" or "FF" (where "F" corresponds to decimal 15) and thus indicates that an overflow condition has been attained, the microcomputer 30 will initiate an error indication subroutine (step 12). Otherwise, if quantity MER is within the predetermined range "01" to "FE", the program is advanced to step 13.

In step 12, if error, or data overflow, is detected as indicated above (corresponding to "NO" in the flow chart) the error indicator 20 is lit to indicate to an operator that the illumination color temperature is outside the range of white balance adjustment, so that the operator can select an appropriate filter. Further, because sufficient adjustment cannot be made, the program goes to step 20.

In step 13, if quantity MER is within the predetermined range (indicated by "YES" in the flow chart), quantity MRF is supplied from the first storage location in RAM 33 to digital-to-analog converter 17, to be converted to an analog level to be supplied to the (−) terminal of comparator 16, where such analog level is compared with the level of the coarsely adjusted red color difference signal R-Y$\pm\Delta Y_r$.

In step 14, which is a decisional step, the microcomputer 30 determines whether the value of the coarsely adjusted color difference signal R-Y$\pm\Delta Y_r$ is higher or lower than the value of the output of converter 17. If the decision is made that the color difference signal is higher ("H" in the flow chart) then the program goes to step 15; if lower ("L" in the flow chart), then to step 16.

Steps 14–16 are used to effect an incremental change in the quantity MER stored in the second storage location in the sense to minimize the difference between the level of the color difference signal and the analog level corresponding to digital quantity MER. If the program goes to step 15, one bit is subtracted from the quantity MER in the second storage location, while if step 16 is selected, one bit is added to the quantity MER stored in the second storage location. Following either of steps 15 and 16, the program progresses to step 17.

In step 17, which is a decisional step, the microcomputer decides whether the number of iterations of the steps 10, 11, and 13–16 are less than a predetermined number N or have equaled such number N. The number of N can, for example, be selected equal to sixteen. If the program has progressed to step 17 less than N times (i.e., from one to fifteen times), then the program returns to step 10. However, when the program has progressed to step 17 N times (i.e., sixteen times), then the fine adjustment of white balance for the red color difference signal R-Y is completed, and the program progresses to step 20.

Step 20 represents the white balance adjustment routine for the blue color difference signal B-Y, and contains all the steps necessary to effect white balance adjustment with respect to the blue color difference signal B-Y. More particularly, switch 12 is actuated to select the blue color difference signal B-Y from the output of mixer 6B and to furnish such signal to sample-and-hold circuit 13. Then steps corresponding to steps 2–17 are performed with respect to the blue color difference signal B-Y to effect both coarse and fine adjustment of white balance. During the operation of step 20, the quantity MRF corresponding to the reference signal $V_{RF}$ is stored in the first storage location in RAM 33 and a quantity MEB (not shown) corresponding to the level $V_{EB}$ of the sampled B-Y color difference signal during a scanning interval $T_P$ is stored in a third storage location in RAM 33. As the steps of the adjustment routine of step 20 are essentially identical to those of steps 1–17, a detailed description thereof is omitted.

Following the completion of the adjustment of the blue color difference signal B-Y, the white balance adjustment program is halted.

Therefore, with the circuit arrangement depicted in FIG. 2, an operator actuates switch 19 while a white reference object is observed by the camera to effect automatic adjustment of white balance. Then, when color difference signals R-Y and B-Y have been completely adjusted for white balance, digital quantities MER and MEB, which are used for white balance adjustment of respective color difference signals R-Y and B-Y, are stored in the second and third storage locations in the RAM 33 of microcomputer 30. These digital quantities MER and MEB are then alternately read out periodically, for example, at each vertical synchronizing signal, and are supplied to the sample-and-hold circuits 18R and 18B, respectively, so that a correctly white-balanced picture can be obtained from the television camera.

As is apparent from the foregoing, according to this invention the white balance adjustment is carried out by obtaining, at the same circuit point, a reference level from the video signal during a blanking interval and a video signal level from the video signal during a scanning interval. Therefore, the risk that drift error is likely to affect white balance is minimized. In addition, because coarse adjustment is first carried out in accordance with the difference between the levels during the blanking interval and during the scanning interval, and fine correction is subsequently carried out, the time required for adjusting white balance is also minimized.

Further, as mentioned above, because coarse white balance adjustment (steps 1–10) and more precise, fine white balance adjustment (steps 11–17), as shown in the flow chart of FIG. 4, are more-or-less discrete subroutines, it is a simple matter to effect only coarse adjustment by following steps 1–10 and omitting steps 11–17, if desired.

Moreover, although in the above-described embodiment, the quantity MRF corresponding to the reference signal $V_{RF}$ is first stored in RAM 33 (steps 4 and 5) and the digital quantity MER corresponding to video signal $V_{ER}$ is subsequently stored in RAM 33 (steps 6 and 7) following which the stored quantities are compared (step 8), it is also possible to perform the steps in a different sequence without departing from the present invention. For example, it is possible to store the quantity corresponding to video signal $V_{ER}$ first, and then to store the quantity corresponding to reference signal $V_{RF}$ thereafter.

Furthermore, the microprocessor 30 used in the embodiment of FIG. 2 permits other complex operations to be easily performed by altering the program stored in ROM 32, with the result that the circuit arrangement used for carrying this invention out can be further simplified.

While the white balance adjustment for color difference signals R-Y and B-Y is achieved in the above-described embodiment of this invention, the present invention can also be applied to adjusting color difference signals G-R and G-B in a three-tube camera.

Still further, automatic black balance can be achieved with the same arrangement as shown in FIG. 2 by changing the program stored in ROM 32, so that it is possible to effect a complete automatic adjustment of the color video signal in three stages: automatic white balance; automatic black balance; automatic white balance.

Although an illustrated embodiment of the present invention has been described in detail hereinabove with reference to the accompanying drawings, it is to be understood that the invention is not limited to that embodiment, and that various modifications and variations may be effected therein by one skilled in the art without departing from the scope and spirit of the invention as defined in the appended claims.

What is claimed is:

1. A method of adjusting the white balance of a video signal formed of a luminance component and at least a first color difference signal, and having video scanning intervals and blanking intervals; and which uses a microcomputer including a memory device having at least first and second addressable storage locations, comprising the steps of:

sampling a reference video signal during one of said blanking intervals;

analog-to-digitally converting the sampled reference video signal to form a digital reference signal;

storing said digital reference signal in said first storage location of said memory device;

sampling said first color difference signal during one of said video scanning intervals;

analog-to-digitally converting the sampled first color difference signal to form a first digital color difference signal;

storing said first digital color difference signal in said second storage location of said memory device;

modifying the stored first digital color difference signal stored in said second storage location so that the modified stored first digital color difference signal has a digital value related to the difference between said stored first digital color difference signal and said digital reference signal stored in said first storage location;

forming a first color difference correction signal that varies with the luminance component and is proportional to the value of the modified stored first digital color difference signal; and combining said first color difference signal with said first color difference correction signal.

2. A method of adjusting the white balance of a video signal according to claim 1, further comprising the steps of:

digital-to-analog converting the modified stored first color difference signal stored in said second storage location to an analog reference level;

level comparing said analog reference signal with the level of said first color difference signal;

changing the modified stored first color difference signal by a predetermined increment in the sense to minimize the difference in level between said analog reference level and said first color difference signal; and adjusting the first color difference correction signal in accordance with the value of the changed stored first color difference signal stored in said second storage location.

3. A method of adjusting the white balance of a video signal according to claim 2, further comprising:

repeating, for a predetermined number of iterations, the steps of said level comparing, said changing, and said adjusting.

4. A method of adjusting the white balance of a video signal according to claim 2, further comprising:

determining whether said modified stored first color difference signal stored in said second storage location is outside a predetermined range; and indicating an error condition if said modified stored first color difference signal is outside said range.

5. A method of adjusting the white balance of a video signal according to claim 1, wherein said video signal further includes a second color difference signal and said memory device further includes a third addressable storage location; further comprising the steps of:

sampling said second color difference signal during one of said video scanning intervals;

analog-to-digitally converting the sampled second color difference signal to form a second digital color difference signal;

storing said second digital color difference signal in said third storage location of said memory device;

modifying the stored second digital color difference signal stored in said third storage location so that the modified stored second digital color difference signal has a digital value related to the difference between said stored second digital color difference signal and said digital reference signal stored in said first storage location;

forming a second color difference correction signal that varies with the luminance component and is proportional to the value of the modified stored second digital color difference signal; and combining said second color difference signal with said color difference correction signal.

6. A method of adjusting the white balance of a video signal according to claim 5, wherein said forming the first color difference correction signal and said forming the second color difference correction signal are carried out successively.

7. In a color television camera of the type which provides a composite color television signal formed of a luminance component and at least one color difference signal and having scanning intervals separated by blanking intervals, a white balance control circuit comprising:

mixer means to combine, with said color difference signal, a color difference correction signal;

adjustable gain control means providing, as said color difference correction signal, a signal that varies with said luminance component and is proportional to a gain control signal applied thereto;

means for sampling said color difference signal during one of said blanking intervals to provide a reference signal and during one of said scanning intervals to provide a sampled color difference signal;

means for converting said reference signal and said sampled color difference signal to digital form;

storage means having a plurality of storage locations for storing said converted reference signal and said converted sampled color difference signal in respective storage locations therein;

means for modifying the stored converted sampled color difference signal so that the latter has a digital value related to the difference between said stored converted sampled color difference signal and said converted reference signal; and means for providing as said gain control signal, a level proportional to the stored value of the modified converted stored sampled color difference signal.

8. A color television camera according to claim 7, further comprising manually actuated means for selectively initiating a white balance adjustment operation.

9. A color television camera according to claim 7, further comprising means for detecting whether the stored converted sampled color difference signal is outside a predetermined range and for providing an indication when said stored converted sampled color difference signal is outside said range.

10. A color television camera according to claim 7, wherein said means for providing said gain control signal includes digital-to-analog converting means for providing a level corresponding to said stored converted sampled color difference signal, and sample-and-hold means for sampling said level during predetermined intervals and providing said gain control signal to said adjustable gain control means.

* * * * *